US011175955B2

(12) United States Patent
Meng et al.

(10) Patent No.: US 11,175,955 B2
(45) Date of Patent: Nov. 16, 2021

(54) NETWORK FUNCTION VIRTUALIZATION SYSTEM AND NETWORK SERVICE INSTANTIATION METHOD

(71) Applicant: XI'AN ZHONGXING NEW SOFTWARE CO., LTD., Shaanxi (CN)

(72) Inventors: Zhaoxing Meng, Shenzhen (CN); Daigang Xu, Shenzhen (CN); Yuhong Xue, Shenzhen (CN); Houqiang Xu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/768,502

(22) PCT Filed: Apr. 13, 2016

(86) PCT No.: PCT/CN2016/079197

§ 371 (c)(1),
(2) Date: Apr. 13, 2018

(87) PCT Pub. No.: WO2016/180143

PCT Pub. Date: Nov. 17, 2016

(65) Prior Publication Data

US 2018/0307538 A1 Oct. 25, 2018

(30) Foreign Application Priority Data

Oct. 14, 2015 (CN) ......................... 201510662615.5

(51) Int. Cl.
*H04L 12/00* (2006.01)
*G06F 9/50* (2006.01)
(Continued)

(52) U.S. Cl.
CPC ........ *G06F 9/5027* (2013.01); *G06F 9/45558* (2013.01); *G06F 9/50* (2013.01);
(Continued)

(58) Field of Classification Search
None
See application file for complete search history.

(56) References Cited

U.S. PATENT DOCUMENTS

2005/0262232 A1* 11/2005 Cuervo ................ H04L 41/044 709/223
2013/0138816 A1 5/2013 Kuo et al.
(Continued)

FOREIGN PATENT DOCUMENTS

CN 104954220 A 9/2015
WO WO-2015/113234 A1 8/2015
(Continued)

OTHER PUBLICATIONS

International Search Report and Written Opinion for International Appl. No. PCT/CN2016/079197, dated Jul. 12, 2016.
(Continued)

*Primary Examiner* — Noel R Beharry
*Assistant Examiner* — Lionel Preval
(74) *Attorney, Agent, or Firm* — Foley & Lardner LLP

(57) ABSTRACT

Provided is a network function virtualization system. The system includes a single-domain virtualized network function manager (VNFM), a single-domain virtualized network function (VNF) entity, and a virtualized infrastructure manager (VIM); one or more network function virtualized single-domain orchestrators (NFV-DO), which are in one-to-one correspondence with single-domains. The NFV-DO includes a virtualized network function orchestrator (VNFO), which is configured to manage one or more of the following functions in the single-domain where the VNFO
(Continued)

is located: a network service instance, a network service life cycle, VNFM instantiation, VNF instantiation and a VNF life cycle. The above solution can meet requirements for phased evolution implemented by a current NFV system and requirements for cross-border, cross-regional, multi-vendor service provision and multi-layer management.

9 Claims, 7 Drawing Sheets

(51) Int. Cl.
*H04L 12/46* (2006.01)
*G06F 9/455* (2018.01)

(52) U.S. Cl.
CPC ............ *G06F 9/5061* (2013.01); *H04L 12/46* (2013.01); *H04L 12/4625* (2013.01); *H04L 12/4641* (2013.01)

(56) References Cited

U.S. PATENT DOCUMENTS

2014/0317261 A1* 10/2014 Shatzkamer ........ G06F 9/45558 709/223
2015/0143368 A1 5/2015 Bugenhagen
2017/0078157 A1* 3/2017 Zhang ..................... H04L 41/14

FOREIGN PATENT DOCUMENTS

WO WO 2015/126430 A1 8/2015
WO WO-2015/143610 A1 10/2015

OTHER PUBLICATIONS

Extended European Search Report for EP Appl. No. 16791993.5, dated May 8, 2019.
Haiqiang Xue et al., "Network function virtualization and standardization", ZTE 1-2, 5 Technology Journal, vol. 21, No. 2, Apr. 30, 2015 (Apr. 30, 2015), ISSN: 1009-6868, section 1.2.
First Office Action for CN Appl. No. 201510662615.5, dated Oct. 12, 2019.
First Office Action for EP Appl. No. 16791993.5, dated May 18, 2021.
Huawei et al.: "3GPP SA5 NFV Standardization Roadmap" 3GPP TSG SA WG5 (Telecom Management) Meeting #102; S5-154407; Aug. 28, 2015; Beijing, China.
SA5: "Guidelines for cooperation between 3GPP TSG SA WG5 and ETSI ISG NFV" 3GPP TSG SA WG5 (Telecom Management) Meeting #102; S5-154462; Aug. 28, 2015; Beijing, China.
Second Office Action for CN Appl. No. 201510662615.5, dated May 18, 2020.

* cited by examiner

NETWORK FUNCTION VIRTUALIZATION SYSTEM AND NETWORK SERVICE INSTANTIATION METHOD

CROSS-REFERENCE TO RELATED APPLICATIONS

This application is a U.S. National Stage under 35 U.S.C. § 371 of International Patent Application No. PCT/CN2016/079197, filed on Apr. 13, 2016, which claims priority to Chinese Patent Application No. 201510662615.5, filed on Oct. 14, 2015, the contents of which are incorporated herein by reference in their entirety for all purposes.

TECHNICAL FIELD

The present disclosure relates to, but not limited to, the field of network function virtualization, and in particular, relates to a network function virtualization system and a network service instantiation method.

BACKGROUND

A network of a network operator is deployed through ever-increasing large dedicated hardware devices. Usually, in order to introduce a new network service, there is a need for another variant, and it is now increasingly difficult to find space and motivation. In addition to this, energy consumption is increased, capital investment is challenged, and there is a lack of a necessary skill for designing, integrating and operating the increasingly complex hardware devices.

With a Network Function Virtualization (NFV) technology, the network operator will undergo radical changes in how to set up their own networks and implement new services. By means of the virtualization technology, the operator may provide faster and better network services and help the operator improve their competitiveness.

FIG. 1 is a NFV system defined by the European Telecommunications Standards Institute (ETSI) in a first phase. As shown in FIG. 1, a block enclosed by a dotted line at right side represents Network Function Virtualization Management and Orchestration (NFV MANO), including a Network Function Virtualization Orchestrator (NFVO), a Network Service (NS) Catalogue, a Virtualized Network Function (VNF) Catalogue, NFV instances, Network Function Virtualization Infrastructure (NFVI) Resources, a Virtualized Network Function Manager (VNFM), which are connected to the NFVO, and a Virtualized Infrastructure Manager (VIM) connected to the VNFM and the NFVO, where the VNFM is also connected to the VNF Catalogue.

Main NFV reference points are set between the NFVO and the VNFM, between the NFVO and the VIM, as well as between the VNFM and the VIM, which are represented by short vertical lines on a solid line in FIG. 1, and are respectively Or-Vnfm, Or-Vi and Vi-Vnfm in FIG. 1. Other NFV reference points are respectively set between the NFVO and the NS Catalogue, the VNF Catalogue, the NFV Instances, and the NFVI Resources as well as between the VNFM and the VNF Catalogue, and are represented by short vertical lines on a dotted line in FIG. 1.

In addition, main NFV reference points are set between the NFVO and an Operation Support System (OSS)/Business Support System (BSS), between the VNFM and an Element Manage (EM)/VNF as well as between the VIM and a Network Function Virtualization Infrastructure (NFVI) as well, and are respectively Os-Ma-nfvo, Ve-Vnfm-em, Ve-Vnfm-vnf and Nf-Vi in FIG. 1. In addition, other NFV reference points are set between the OSS/BSS and the EM, between the OSS/BSS and the NFVI as well as between the EM and the VNF. Execution reference points Vn-Nf are set between the VNF and the NFVI, and are represented by short vertical line on the solid line with origins at two ends in FIG. 1.

FIG. 2 is a draft defined in a second phase, in which the resource orchestration management and the service orchestration management are separated, and the NFV MANO in FIG. 1 is canceled. The NFVO is divided into two portions, namely, a Network Service Orchestrator (NSO) and a Cross-domain Resource Orchestrator (CDRO). The EM is replaced with a network manage system (ENMS). The OSS/BSS, the ENMS, the VNF, the NS Catalogue, the VNF Catalogue, the VNFM, and the NSO are grouped into a tenant domain; and the CDRO, the NFV Instances, the NFVI Resources, the VIM, and the NFVI are grouped into a NFV infrastructure domain.

The main NFV reference points set between the NSO and the VNFM, between the NSO and the OSS/BSS, between the VNFM and the VIM, between the VNFM and the ENMS, and between the VNFM and the VNF are respectively Nfvo-Vnfm, Os-Nfvo, Vnfm-Vi, VeEn-Vnfm and VeNf-Vnfm in FIG. 2. The main NFV reference points set between the CDRO and the VIM as well as between the VIM and the NFVI are Nfvo-Vi and Nf-Vi in FIG. 2; and the execution reference points set between the VNF and the NFVI are Vn-Nf.

However, a current solution does not take a multi-domain complex operating environment such as phased evolution of the system implementation and multinational, cross-regional and multi-vendor service provision into account. The implementation process of NFV may be a phase evolution for implementation which is firstly from a single-domain NFV and then extends to full-domain NFV. Alternatively, the implementation process of NFV may be a phase evolution for implementation which is firstly in a certain administrative domain and then extended to a full-administrative domain. At this point, it is difficult to meet requirements with a single service orchestration.

SUMMARY

The following is a summary of the subject matter detailed in this disclosure. This summary is not intended to limit a protection scope of claims.

An embodiment of the present disclosure discloses an NFV system and a network service instantiation method, which can meet requirements for phased evolution implemented by a current NFV system and for multinational, cross-regional and multi-vendor service provision and multi-layer management.

An embodiment of the present disclosure provides a network function virtualization (NFV) system, including:

a single-domain virtualized network function manager (VNFM); a single-domain virtualized network function (VNF) entity; a virtualized infrastructure manager (VIM); and one or more network function virtualized single-domain orchestrators (NFV-DO), which are in one-to-one correspondence with single-domains.

The NFV-DO comprises a virtualized network function orchestrator (VNFO), and the VNFO is configured to manage any one or more of the following functions in a single-domain in which the NFFO is located: network service instance, network service life cycle, VNFM instantiation, VNF instantiation, and VNF life cycle.

Alternatively, the NFV-DO further includes:

a single-domain resource orchestrator (RO), and wherein the single-domain RO is configured to perform any one or more of the following processes in a single-domain in which the single-domain RO is located: association of a VNF instance and a resource, resource authentication and management, resource orchestration policy management, and resource monitoring.

Alternatively, the NFV system further includes:

a network function virtualization orchestrator (NFVO).

The NFVO comprises a service orchestrator (SO) and a cross-domain resource orchestrator (CDRO).

The SO interacts with one or more VNFOs interfaced with the SO, and interacts with an operation support system (OSS) or a business support system (BSS), and is configured to perform any one or more of the following cross-domain processes: network service orchestration, network service instance management, network service life cycle management, network service, and VNF instance policy management.

The CDRO interacts with one or more NFV-Dos interfaced with the CDRO and/or interacts with multiple VIMs, and is configured to perform any one or more of the following cross-domain processes: resource authentication and management, resource orchestration policy management, and resource monitoring.

Alternatively, the NFVO belongs to a network service layer; the NFV-DO, the VNFM and a VNF entity belong to a domain layer; and the VIM belongs to a virtual resource layer.

the system further includes a computing resource pool, a network resource pool and a storage resource pool, which belong to the virtual resource layer; and an infrastructure belonging to a physical layer.

Alternatively, when the system further includes an NFVO and the NFV-DO further includes an RO, the RO is configured to: forward a resource application in a single-domain in which the RO is located to the CDRO or transmit the resource disclosure in the single-domain in which the RO is located to the VIM.

When the system does not include the NFVO and the NFV-DO includes an RO, the RO is configured to: transmit a resource application in the single-domain in which the RO is located to the VIM.

When the NFV-DO does not include the RO, a resource application in a single-domain is processed by the CDRO.

An embodiment of the present disclosure further provides a network service instantiation method applied to the above NFV system, including:

upon receiving a virtualized network function (VNF) instantiation request by a virtualized network function orchestrator (VNFO) of a single-domain, the VNFO of the single-domain transmitting a resource reservation application;

upon receiving resource reservation information indicating that the resource reservation application is successful, the VNFO initiating a VNF instantiation request to the virtual network function manager (VNFM) of the single-domain in which the VNFO is located; and the VNFM initiating a resource instantiation request to a virtualized infrastructure manager (VIM) according to the resource reservation information.

Alternatively, the transmitting a resource reservation application includes:

when the VNFO determines that the single-domain in which the VNFO is located has a resource orchestrator (RO), the VNFO transmitting the resource reservation application to the RO;

the RO determining whether the RO is a channel, if the RO is a channel, transmitting the resource reservation application to a cross-domain resource orchestrator (CDRO) by the RO; if the RO is not a channel, transmitting the resource reservation application to the VIM by the RO; and when the VNFO determines that the single-domain in which the VNFO is located has no RO, transmitting the resource reservation application to the CDRO by the VNFO; and initiating the resource reservation application to the VIM by the CDRO.

Alternatively, after transmitting a resource reservation application, the method further includes:

the RO receiving the resource reservation information from the VIM and transmitting the resource reservation information to the VNFO of the single-domain;

or the CDRO receiving the resource reservation information fed back by the VIM and feeding the resource reservation information to the VNFO that transmits the resource reservation application.

Alternatively, before the VNFO of the single-domain receives the VNF instantiation request, the method further includes:

receiving a network service instantiation request by a service orchestrator (SO); determining a home domain of a VNF instance in a service by the SO; if the VNF instance belongs to a single-domain, transmitting, by the SO, the VNF instantiation request to a VNFO in the single-domain to which the VNF instance belongs; and if the VNF instance is a cross-domain VNF instance, transmitting, by the SO, a cross-domain VNF instantiation request to a cross-domain independent VNFM.

Alternatively, after the transmitting a cross-domain VNF instantiation request to a cross-domain independent VNFM, the method further includes:

initiating the resource reservation application to the CDRO by the cross-domain independent VNFM;

initiating the resource reservation application to the VIM by the CDRO, receiving, by the CDRO, the resource reservation information fed back by the VIM, and transmitting, by the CDRO, the resource reservation information to the cross-domain independent VNFM; and initiating the resource instantiation request to the VIM by the cross-domain independent VNFM according to the resource reservation information.

Furthermore, an embodiment of the present disclosure further provides a computer-readable storage medium storing computer-executable instructions, where the computer-executable instructions, when being executed, implement the foregoing network service instantiation method.

The embodiments of the present disclosure can meet requirements for phased evolution implemented by a current NFV system and for multinational, cross-regional, multi-vendor service provision and multi-layer management.

Additional features and advantages of the present disclosure will be set forth in the description which follows, and in part will be obvious from the description, or may be learnt by practice of the disclosure. The objectives and other advantages of the present disclosure may be realized and attained by the structure particularly pointed out in the description and claims hereof as well as the accompanying drawings.

Other aspects may be understood upon reading and understanding the accompanying drawings and the detailed description.

BRIEF DESCRIPTION OF DRAWINGS

Accompanying drawings are used to provide a further understanding of the technical solution of the present disclosure, and constitute a part of the specification. Together with embodiments of the present disclosure, the accompanying drawings are used to explain the technical solution of the present disclosure, and do not constitute limitations on the technical solution of the present disclosure.

DETAILED DESCRIPTION

The technical solution of the present disclosure will be described in more detail below with reference to accompanying drawings and embodiments.

It is to be noted that, if there is no conflict, the embodiments of the present disclosure and various features in the embodiments may be combined with each other and are all within the protection scope of the present disclosure. In addition, although a logical order is shown in the flow diagram, in some cases, the illustrated or described steps may be performed in a different order.

A First Embodiment

Figure 1:
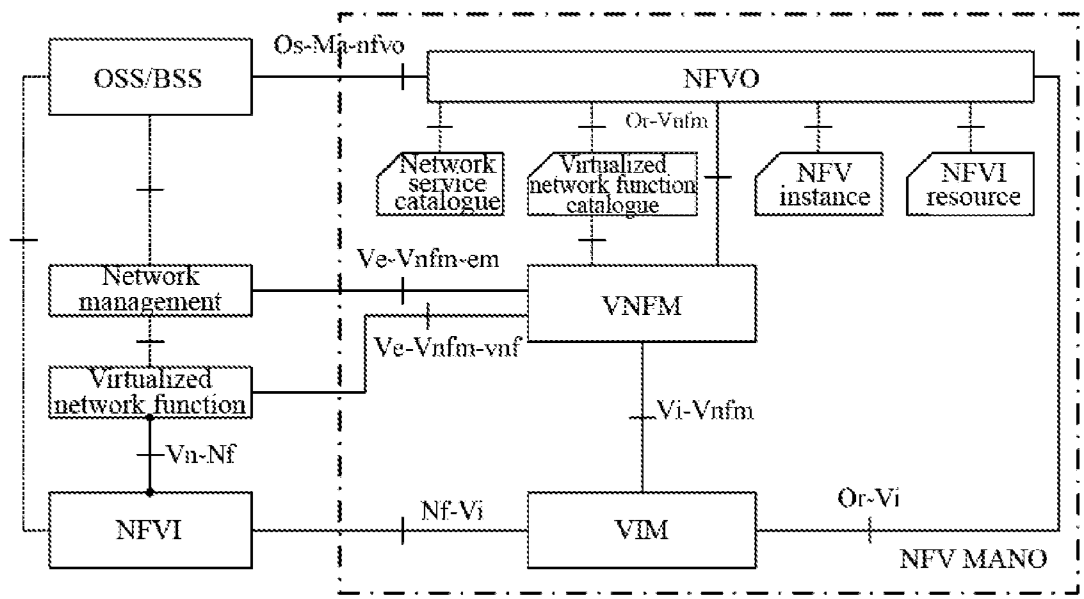
FIG. 1 is a diagram showing a NFV system defined by the ETSI in a first phase.
Figure 2:
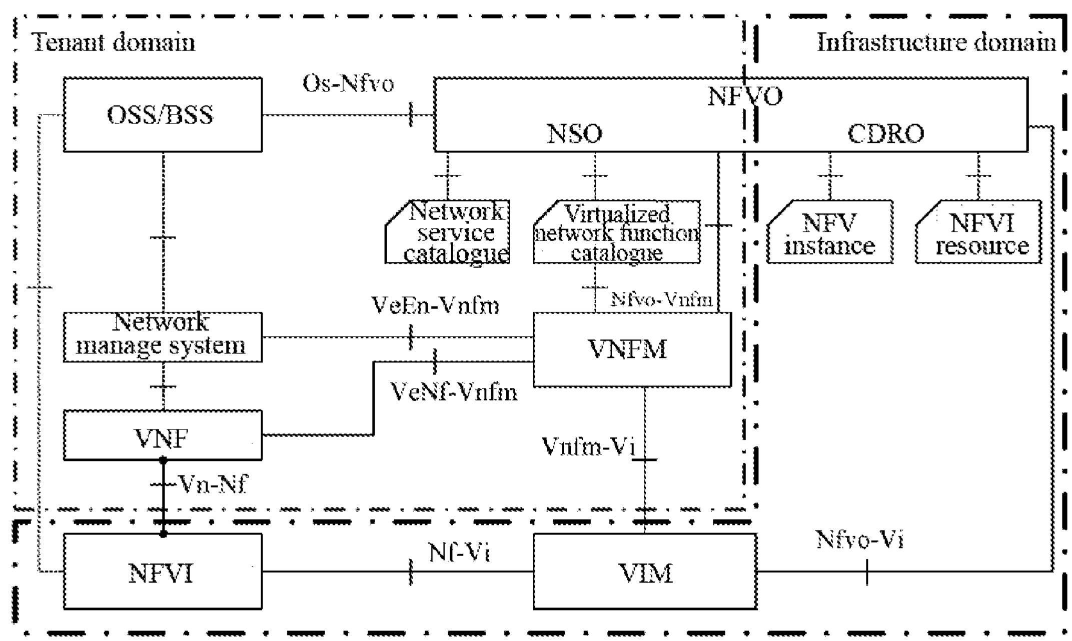
FIG. 2 is a diagram showing a draft NFV system defined by the ETSI in a second phase.
Figure 3:
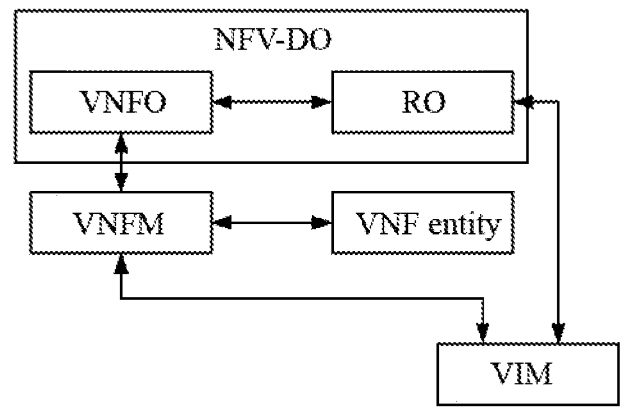
FIG. 3 is a schematic diagram showing a NFV system according to a first embodiment.

The present embodiment provides a NFV system. As shown in FIG. 3, the NFV system includes:

a network function virtualization single-domain orchestrator (NFV-DO), a single-domain virtualized network function manager (VNFM), a single-domain virtualized network function (VNF) entity, and a virtualized infrastructure manager (VIM).

The VNFM is configured to manage the NFV entity.

There may be one or more NFV-DOs, which are in one-to-one correspondence with single-domains;

The NFV-DO includes a virtualized network function orchestrator (VNFO).

The VNFO is configured to manage any one or more of the following functions in a single-domain in which the VNFO is located: a network service instance, a network service life cycle, YNFM instantiation, VNF instantiation and a VNF life cycle.

Alternatively, the NFV-DO further includes a single-domain resource orchestrator (RO). The RO may exist as required or may not exist as required.

The RO is configured to perform any one or more of the following processes in the single-domain in which the RO is located: association of a VNF instance and a resource, resource authentication and management, resource orchestration policy management, resource monitoring, and the like.

Alternatively, the NFV-DO may not exist as well, and when the NFV-DO does not exist, a NFV system in the relevant standard may be compatible.

Alternatively, the NFV system further includes a NFVO;

The NFVO includes a service orchestrator (SO) and a cross-domain resource orchestrator (CDRO).

The SO is configured to perform any one or more of the following cross-domain (multiple product domains or multiple administrative domains) processes: network service orchestration, network service instance management, network service life cycle management, and network service and VNF instance policy management. The SO interacts with one or more VNFOs interfaced with the SO, and interacts with an OSS/BSS.

The CDRO is configured to perform any one or more of the following cross-domain (multiple product domains or multiple administrative domains) processes: resource authentication and management, resource orchestration policy management and resource monitoring. The CDRO interacts with one or more NFV-DOs interfaced with the CDRO and/or interacts with multiple VIMs.

Alternatively, in the presence of the NFVO, when there is an RO in the domain, a resource application in the domain may be forwarded to the CDRO of the NFVO through the RO, at this time, the RO serves as a forwarding channel. Alternatively, it may also interact with multiple VIMs through the RO, at this time, the RO and the CDRO do not interact with each other. Alternatively, the RO may interact with the CDRO only when there is a cross-domain resource application (such as the resource of this domain is insufficient). Otherwise, the RO only interacts with multiple VIMs. When there is no RO in the domain, the resource application is processed through the CDRO of the NFVO. In the absence of the NFVO, the RO must exist.

Alternatively, the system may be applied to a four-layer framework: a network service layer, a domain layer, a virtual resource layer, and a physical layer. When being applied in a single-domain, the system may be applied to a three-layer framework: a domain layer, a virtual resource layer, and a physical layer.

Figure 4:
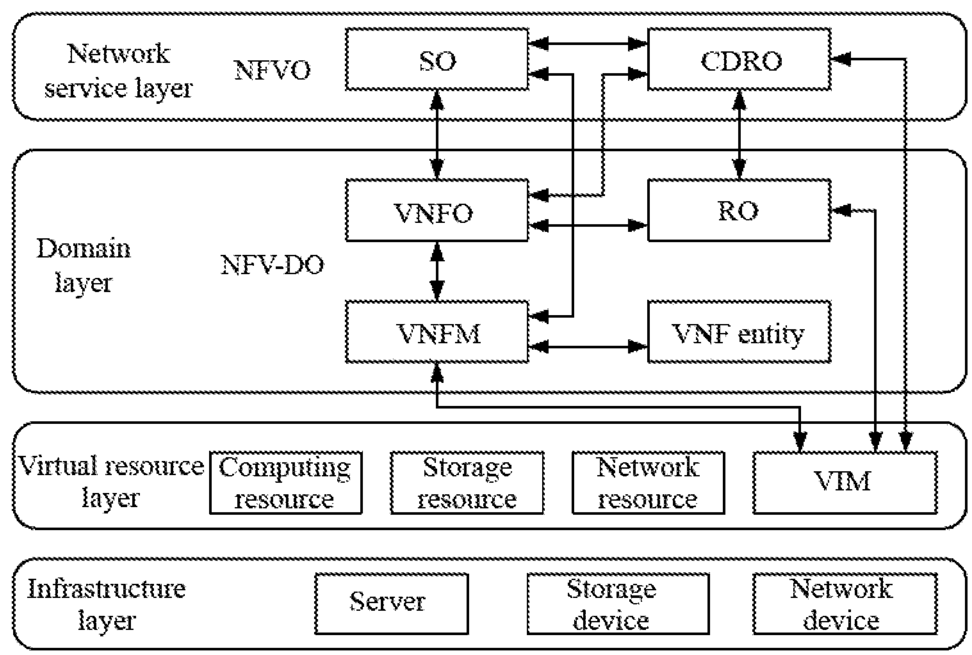
FIG. 4 is a schematic diagram showing layers of the NFV system according to the first embodiment.

As shown in FIG. 4, the NFVO belongs to the network service layer, and may include a SO and a CDRO;

The NFV-DO, the VNFM and the VNF entity belong to the domain layer; and the NFV-DO may include a VNFO and a RO.

The virtual resource layer may include multiple VIMs and a computing resource pool, a network resource pool, and a storage resource pool, and is responsible for actually processing virtual resources, such as virtual machine creation, deletion, and migration.

The physical layer may include infrastructures such as a server, a storage device, and a network device.

Figure 5:
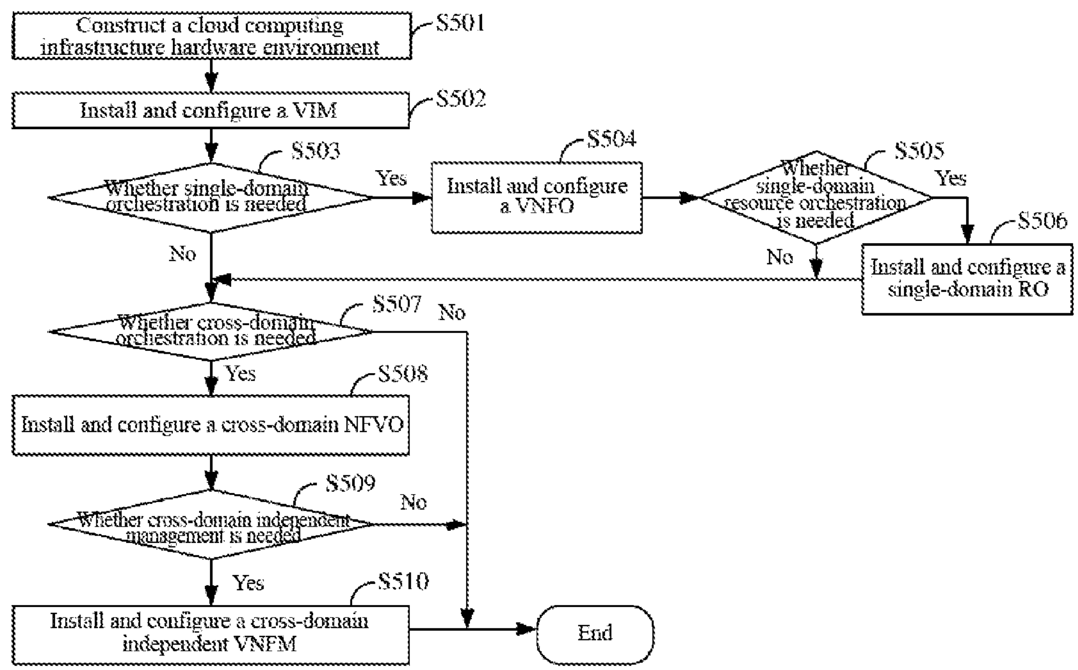
FIG. 5 is a flowchart of an implementation method of the NFV system according to the first embodiment.

An implementation method of the NFV system of the first embodiment is shown in FIG. 5 and includes the following steps:

In step S501, a cloud computing infrastructure hardware environment is built, which includes a computing facility, a storage facility, and a network facility.

In step S502, a virtualized infrastructure manager (VIM) is installed and configured.

In step S503, it is determined whether single-domain orchestration is needed or not, that is, it is determined whether a network function virtualized single-domain orchestrator (NFV-DO) is needed or not.

If the single-domain orchestration is needed, the method proceeds to step S504, and if the single-domain orchestration is not needed, the method proceeds to step S507.

In step S504, a virtual network function orchestrator (VNFO) is installed and configured for each single-domain.

In step S505, it is determined, for each single-domain, whether single-domain resource orchestration is needed.

If the single-domain resource orchestration is needed, the method proceeds to step S506, and if the single-domain resource orchestration is not needed, the method proceeds to step S507.

In step S506, a single-domain RO is installed and configured.

In step S507, it is determined whether cross-domain orchestration is needed or not.

If the cross-domain orchestration is needed, the method proceeds to step S508, and if the cross-domain orchestration is not needed, the method ends.

In step S508, a cross-domain network function virtualization orchestrator (NFVO) is installed and configured.

In step S509, it is determined whether cross-domain independent management is needed or not.

If the cross-domain independent management is needed, the method proceeds to step S510, and if the cross-domain independent management is not needed, the method ends.

In step S510, a cross-domain independent virtualized network function manager (VNFM) is installed and configured; and the method ends.

A First Implementation Example

Figure 6:
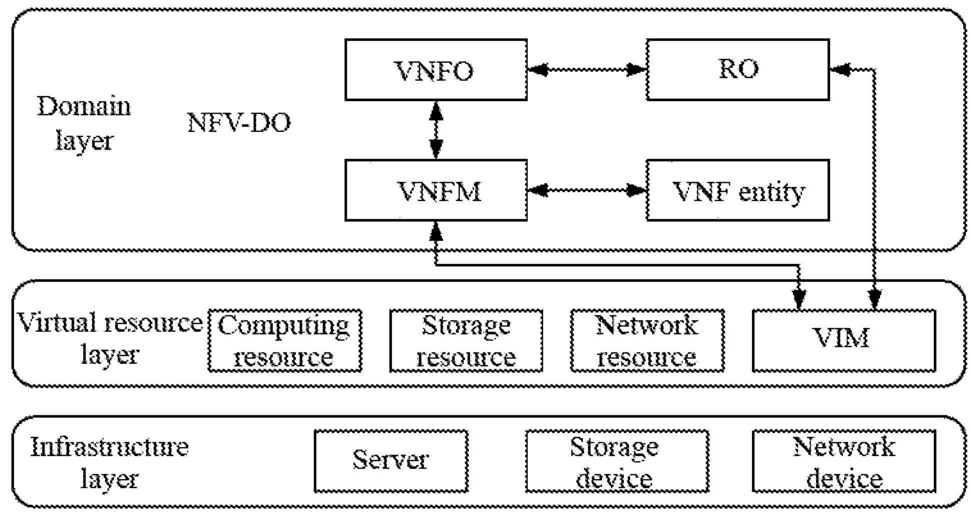
FIG. 6 is a schematic diagram of an implementation in which the NFV domain has no network service layer according to a first implementation example.

FIG. 6 is a schematic diagram of an implementation in which the NFV domain has no network service layer according to an embodiment of the present disclosure. In this case, the implementation is applied in a single-domain scenario to complete self-operation and maintenance of a single-domain, for example, a core network product domain, or a certain administrative domain east region. In this case, the VNFO is responsible for network service orchestration management, life cycle management and the like of this domain, and the resource orchestration is performed through a RO. The implementation includes the following steps.

In step 11, a cloud computing infrastructure hardware environment is built, which includes a computing facility, a storage facility, and a network facility.

In step 12, a VIM is installed and configured.

In step 13, it is determined whether single-domain orchestration is needed or not (that is, whether a NFV-DO is needed or not). If the single-domain orchestration is needed, a VNFO is installed and configured for each single-domain.

In step 14, it is determined, for each single-domain, whether single-domain resource orchestration is needed or not. If the single-domain resource orchestration is needed, a single-domain RO is installed and configured.

A Second Implementation Example

Figure 7:
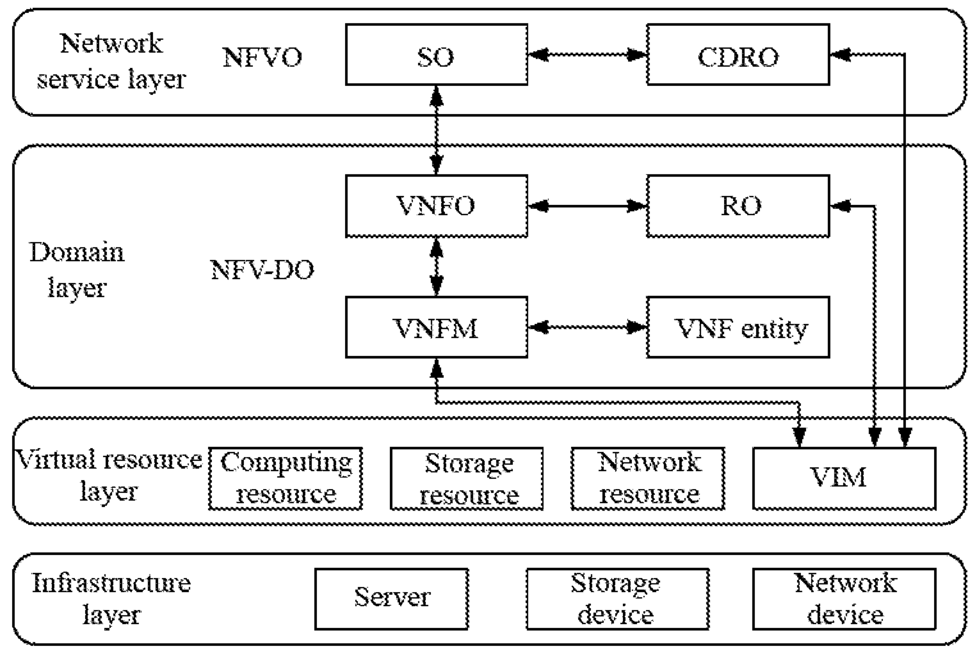
FIG. 7 is a schematic diagram of an implementation in which the NFV domain has a network service layer according to a second implementation example.

FIG. 7 is a schematic diagram of an implementation in which the NFV domain has with a network service layer according to an embodiment of the present disclosure. In this case, cross-domain network service and resource orchestration is completed in the NFVO. Single-domain network service and resource orchestration are delivered to a NFV-DO of the single-domain for completion. In this case, the resource orchestration within the NFV-DO is completed by direct interaction of a RO with one or more VIMs, the RO completes logic processing of the resource orchestration of this domain. If the cross-domain resource orchestration is involved, a CDRO of the NFVO interacts with one or more VIMs to perform the cross-domain resource orchestration. The implementation includes the following steps.

In step 21, a cloud computing infrastructure hardware environment, which includes a computing facility, a storage facility, and a network facility, is built.

In step 22, a VIM is installed and configured.

In step 23, it is determined whether single-domain orchestration is needed or not (that is, whether a NFV-DO is needed or not). If the single-domain orchestration is needed, a VNFO is installed and configured for each single-domain.

In step 24, it is determined, for each single-domain, whether single-domain resource orchestration is needed or not. If the single-domain resource orchestration is needed, a single-domain RO is installed and configured.

In step 25, it is determined whether cross-domain orchestration is needed or not; and if the cross-domain orchestration is needed, a cross-domain NFVO is installed and configured.

A Third Implementation Example

Figure 8:
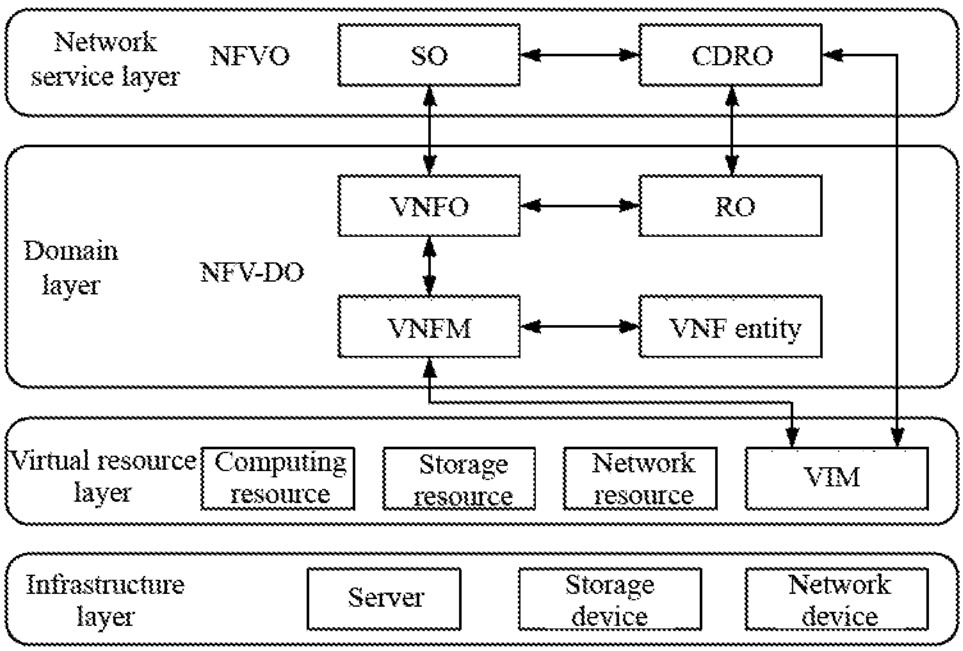
FIG. 8 is a schematic diagram of an implementation in which the NFV domain has a network service layer, a domain layer, and an RO forwarding channel according to a third implementation example.

FIG. 8 is a schematic diagram of an implementation in which the NFV domain has a network service layer, a domain layer, and an RO forwarding channel according to an embodiment of the present disclosure. In this case, cross-domain network service and resource orchestration are completed in the NFVO. Single-domain network service and resource orchestration are delivered to a NFV-DO of the single-domain for completion. In this case, the resource orchestration within the NFV-DO is forwarded to a CDRO by the RO for execution. The RO does not perform logical processing of the resource orchestration or only performs simple logical processing. The CDRO of the NFVO interacts with one or more VIMs to complete the resource orchestration. The implementation includes the following steps.

In step 31, a cloud computing infrastructure hardware environment is built, which includes a computing facility, a storage facility, and a network facility.

In step 32, a VIM is installed and configured.

In step 33, it is determined whether single-domain orchestration is needed or not (that is, whether a NFV-DO is needed or not); if the single-domain orchestration is needed, a VNFO is installed and configured for each single-domain.

In step 34, it is determined, for each single-domain, whether single-domain resource orchestration is needed or not. In this implementation example, a determination result is that the single-domain resource orchestration is not needed, a single-domain RO is still installed and configured as a channel for interfacing CDRO.

In step 35, it is determined whether cross-domain orchestration is needed or not; and if the cross-domain orchestration is needed, a cross-domain NFVO is installed and configured.

A Fourth Implementation Example

Figure 9:
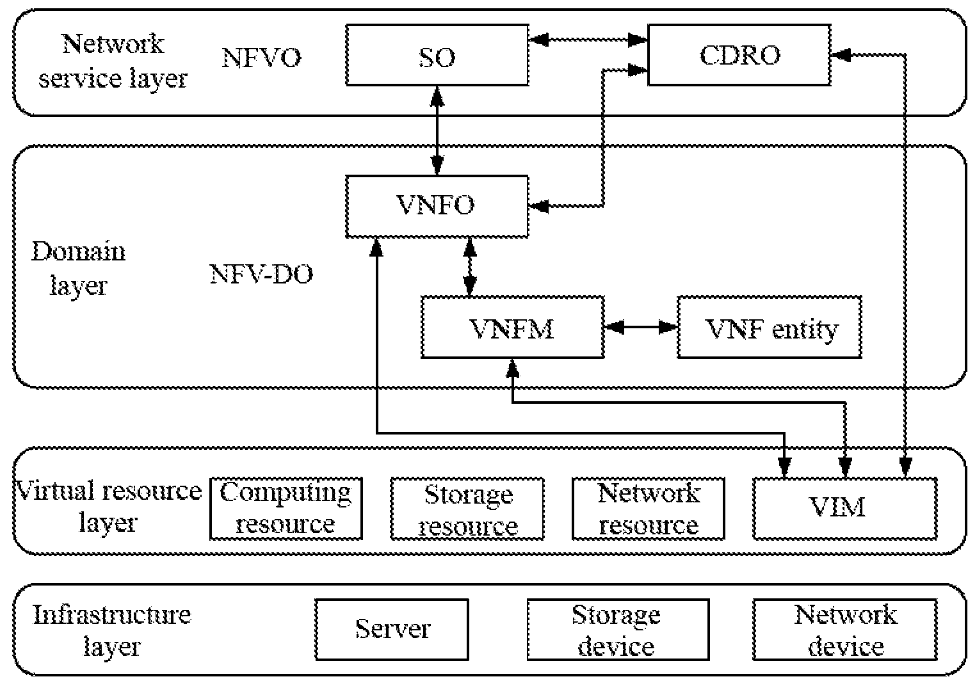
FIG. 9 is a schematic diagram of an implementation in which the NFV domain has a network service layer and a domain layer but has no RO according to a fourth implementation example.

FIG. 9 is a schematic diagram of an implementation when the NFV domain has a network service layer and a domain layer but has no RO according to an embodiment of the present disclosure. The development of resource management and orchestration has a tendency of centralization. This scenario may exist in a scenario having an early single-domain, a later cross-domain orchestration, and requiring a centralizing resource management and orchestration. In this case, cross-domain network service and resource orchestration are completed in the NFVO. Single-domain network service and resource orchestration are delivered to a single-domain NFV-DO for completion. In this case, the resource orchestration within the NFV-DO is completed by direct interaction with a CDRO, and the CDRO of the NFVO interacts with one or more VIMs to complete the resource orchestration. The implementation includes the following steps.

In step 41, a cloud computing infrastructure hardware environment is built, which includes a computing facility, a storage facility, and a network facility.

In step 42, a VIM is installed and configured.

In step 43, it is determined whether single-domain orchestration is needed or not (that is, whether a NFV-DO is needed or not). If the single-domain orchestration is needed, a VNFO is installed and configured for each single-domain.

In step 44, it is determined, for each single-domain, whether single-domain resource orchestration is needed or not. In this implementation example, a determination result is that the single-domain resource orchestration is not needed.

In step 45, it is determined whether cross-domain orchestration is needed or not; and if the cross-domain orchestration is needed, a cross-domain NFVO is installed and configured.

A Fifth Implementation Example

Figure 10:
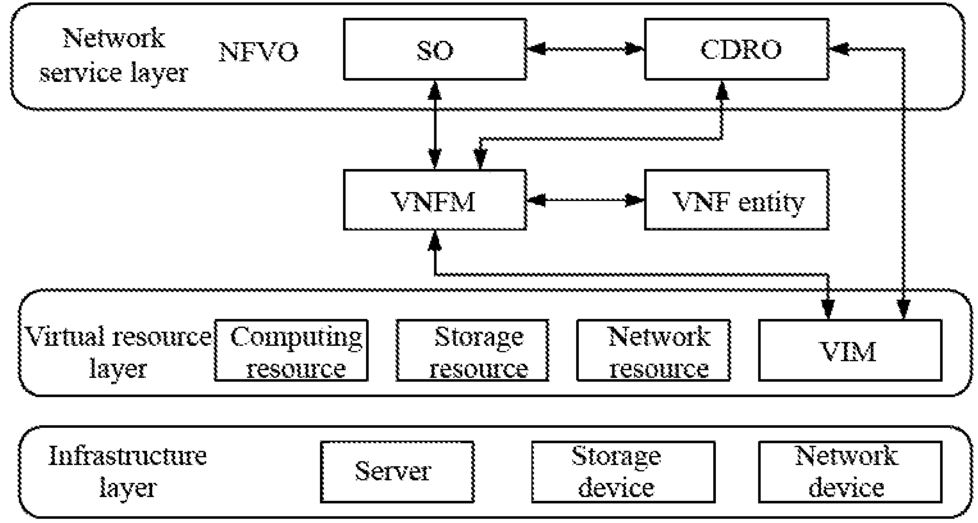
FIG. 10 is a schematic diagram of an implementation in which the NFV domain has a network service layer but has no domain layer according to a fifth implementation example.

FIG. 10 is a schematic diagram of an implementation in which the NFV domain has a network service layer but has no domain layer according to an embodiment of the present disclosure. In this case, all network service and resource orchestrations are completed in a NFVO, and a SO interacts with an independent VNFM. The implementation includes the following steps.

In step 51, a cloud computing infrastructure hardware environment is built, which includes a computing facility, a storage facility, and a network facility.

In step 52, a VIM is installed and configured.

In step 53, it is determined whether single-domain orchestration is needed or not (that is, whether a NFV-DO is needed or not). In this implementation example, a determination result is that the single-domain orchestration is not needed.

In step 54, it is determined whether cross-domain orchestration is needed or not; and if the cross-domain orchestration is needed, a cross-domain NFVO is installed and configured.

In step 55, it is determined whether a cross-domain independent VNFM is needed or not; and if the cross-domain independent VNFM is needed, the cross-domain independent VNFM is installed and configured.

A Sixth Implementation Example

Figure 11:
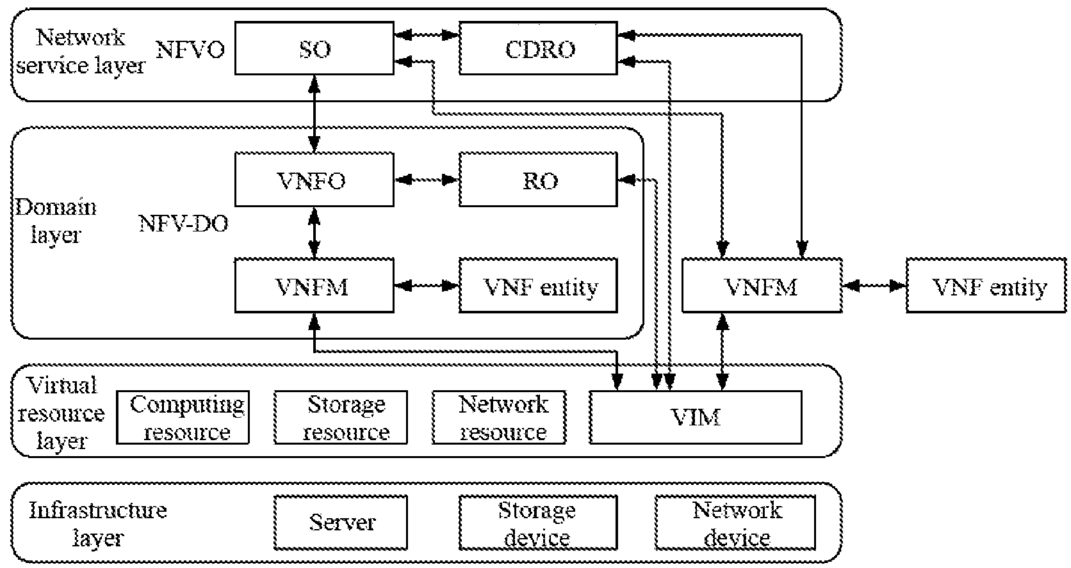
FIG. 11 is a schematic diagram of an implementation in which the NFV domain has a network service layer, a domain layer, and a cross-domain VNFM according to a sixth implementation example.

FIG. 11 is a schematic diagram of an implementation when the NFV domain has a network service layer, a domain layer, and a cross-domain VNFM according to an embodiment of the present disclosure. In this case, cross-domain network service and resource orchestrations are completed in a NFVO. Single-domain network service and resource orchestrations are sent to a single-domain NFV-DO for execution. In this case, the resource orchestration within the NFV-DO is completed by direct interaction of a RO with one or more VIMs If the cross-domain resource orchestration is involved, a CDRO of the NFVO interacts with the one or more VIMs to complete the cross-domain resource orchestration. The cross-domain service orchestration is completed by interaction between a SO and a VNFM. The resource application is completed by interaction between the VNFM and the CDRO. The implementation includes the following steps.

In step 61, a cloud computing infrastructure hardware environment is built, which includes a computing facility, a storage facility, and a network facility.

In step 62, a VIM is installed and configured.

In step 63, it is determined whether single-domain orchestration is needed or not (that is, whether a NFV-DO is needed or not); if the single-domain orchestration is needed, a VNFO is installed and configured for each single-domain.

In step 64, it is determined, for each single-domain, whether single-domain resource orchestration is needed or not; and if the single-domain resource orchestration is needed, a single-domain RO is installed and configured.

In step 65, it is determined whether cross-domain orchestration is needed or not; and if the cross-domain orchestration is needed, a cross-domain NFVO is installed and configured.

In step 66, it is determined whether a cross-domain independent VNFM is needed or not; and if the cross-domain independent VNFM is needed, the cross-domain independent VNFM is installed and configured.

A Second Embodiment

Figure 12:
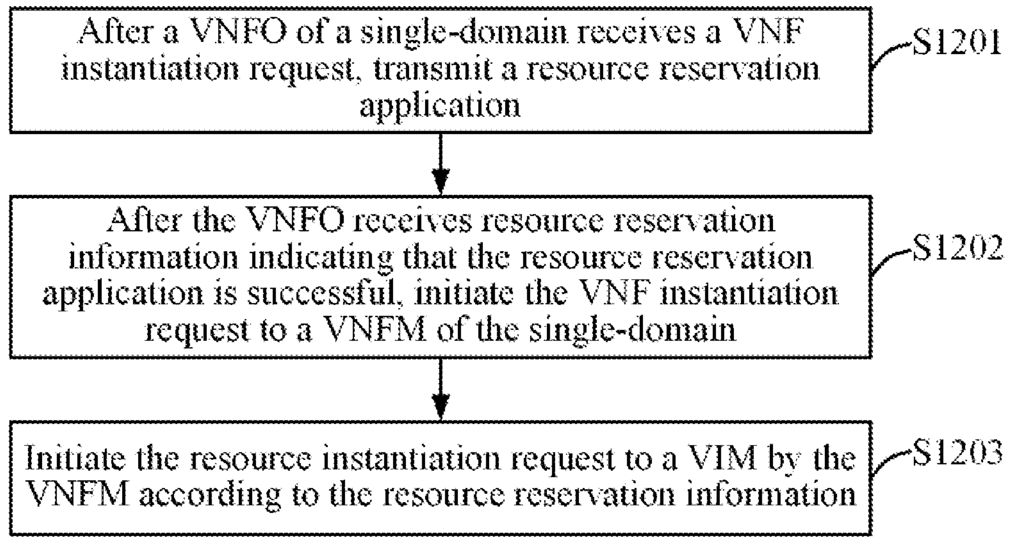
FIG. 12 is a schematic flowchart of network service instantiation according to a second embodiment.

The present embodiment provides a network service instantiation method applied to the above NFV system. As shown in FIG. 12, the network service instantiation method includes the following steps.

In step S1201, after a single-domain VNFO receives a VNF instantiation request, a resource reservation application is transmitted by the single-domain VNFO.

In step S1202, after the VNFO receives resource reservation information indicating that the resource reservation application is successful, the VNFO initiates a VNF instantiation request to a VNFM of the single-domain in which the VNFO is located.

In step S1203, the VNFM initiates a resource instantiation request to a VIM according to the resource reservation information.

Alternatively, the transmitting a resource reservation application includes:

when the VNFO determines that the single-domain has a RO, the VNFO transmits the resource reservation application to the RO;

the RO determines whether the RO is a channel or not, if the RO is a channel, the RO transmits the resource reservation application to a CDRO; if not, the RO transmits the resource reservation application to the VIM; and when the VNFO determines that the single-domain has no RO, the VNFO transmits the resource reservation application to the CDRO; and the CDRO initiates the resource reservation application to the VIM.

Alternatively, after transmitting the resource reservation application, the method further includes:

the RO receives the resource reservation information from the VIM and transmits the resource reservation information to the VNFO in this single-domain;

or the CDRO receives the resource reservation information fed back by the VIM and transmits the resource reservation information to the VNFO that transmits the resource reservation application.

Alternatively, before the single-domain VNFO receives the VNF instantiation request, the method further includes:

a SO receives a network service instantiation request, and determines a home domain of a VNF instance in the service. If the VNF instance belongs to this single-domain, the SO transmits the VNF instantiation request to the VNFO of the single-domain to which the VNF instance belongs; and if the VNF instance is cross-domain VNF instance, the SO transmits a cross-domain VNF instantiation request to a cross-domain independent VNFM.

Alternatively, after the transmitting a cross-domain VNF instantiation request to a cross-domain independent VNFM, the method further includes:

the cross-domain independent VNFM initiates the resource reservation application to the CDRO;

the CDRO initiates the resource reservation request to the VIM, receives the resource reservation information fed back by the VIM, and transmits the resource reservation information to the cross-domain independent VNFM; and the cross-domain independent VNFM initiates a resource instantiation request to the VIM according to the resource reservation information.

Figure 13:
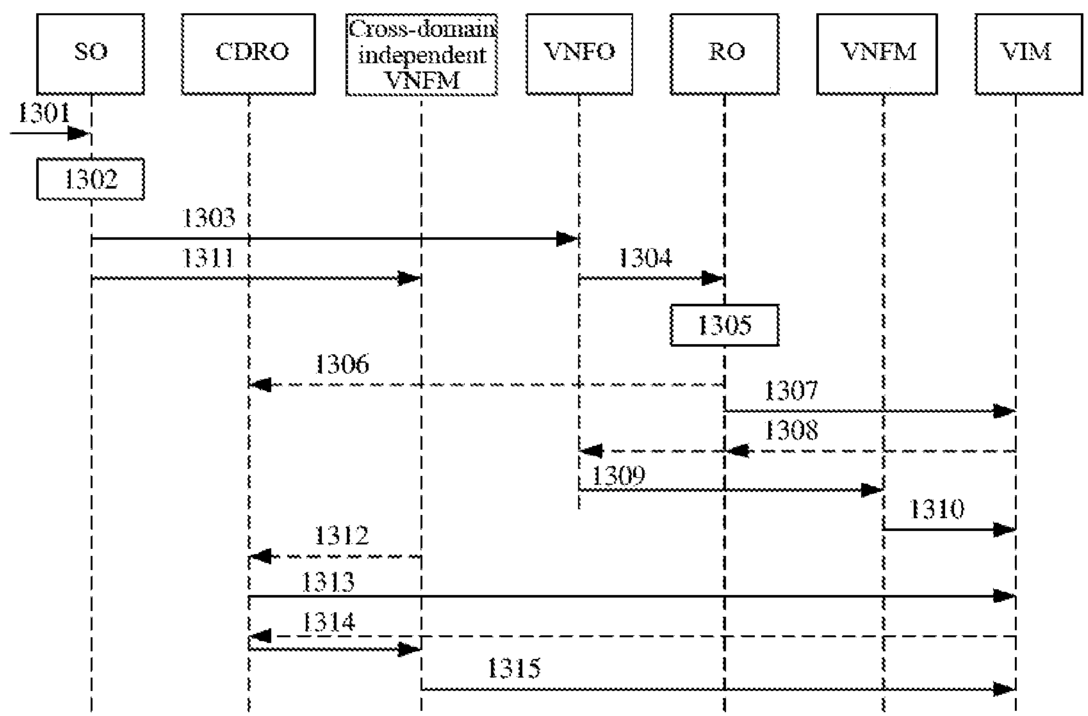
FIG. 13 is a schematic diagram of an example according to a second embodiment.

An example of this embodiment is shown in FIG. 13 and includes the following steps.

In step S1301, a network service instantiation request is initiated.

In step S1302, a service orchestrator (SO) determines a home domain of a VNF instance in a service. If the VNF instance belongs to a certain single-domain, the method proceeds to step S1303; and if the VNF instance is a cross-domain VNF instance, the method proceeds to step S1311.

In step S1303, the SO transmits a VNF instantiation request to the corresponding single-domain virtualized network function orchestrator (VNFO).

In step S1304, in this example, this single-domain has a resource orchestrator (RO), the VNFO transmits a resource reservation application to the RO. If there is no RO in other examples, the VNFO transmits the resource reservation application to a cross-domain resource orchestrator (CDRO).

In step S1305, the RO determines whether the RO is a channel or not. If the RO is a channel, the method proceeds to step S1306; and if not, the method proceeds to step S1307.

In step S1306, the RO transmits the resource reservation application to the CDRO and the method proceeds to step S1313.

In step S1307, the RO transmits the resource reservation application to a virtualized infrastructure manager (VIM).

In step S1308, the RO receives the resource reservation information fed back by the VIM and transmits the resource reservation information to the VNFO.

In step S1309, after receiving the resource reservation information, indicating that the resource reservation application is successful, fed back by the RO, the VNFO initiates a VNF instantiation request to the virtualized network function manager (VNFM).

In step S1310, the VNFM initiates a resource instantiation request to the VIM according to the resource reservation information.

In step S1311, the SO transmits a cross-domain VNF instantiation request to a cross-domain independent VNFM.

In step S1312, the cross-domain independent VNFM initiates a resource reservation application to the CDRO.

In step S1313, the CDRO initiates the resource reservation application to the VIM.

In step S1314, the CDRO receives the resource reservation information fed back by the VIM, and transmits the resource reservation information fed back by the VIM to the cross-domain independent VNFM.

In step S1315, the cross-domain independent VNFM initiates a resource instantiation request to the VIM according to the resource reservation information.

Furthermore, an embodiment of the present disclosure further provides a computer-readable storage medium storing computer-executable instructions, where the computer-executable instructions, when being executed, implement the foregoing network service instantiation method.

A person ordinarily skilled in the art may understand that all or a part of steps in the above method may be done by a program to instruct related hardware (for example, a processor), and the program may be stored in a computer-readable storage medium, such as a read-only memory, a magnetic disk, or an optical disk. Alternatively, all or a part of the steps of the above embodiments may be implemented by using one or more integrated circuits. Accordingly, each module/unit in the above embodiments may be implemented in the form of hardware, for example, the corresponding function of the each module/unit is implemented by the integrated circuit(s); or may be implemented in the form of a software function module, for example, the corresponding function of the each module/unit is implemented by a processor through executing the programs/instructions stored in a memory. The present disclosure is not limited to any specific combination of hardware and software.

While the embodiments disclosed in the present disclosure are as described above, the contents described are merely embodiments for facilitating understanding of the present disclosure, and are not intended to limit the present disclosure. Any person skilled in the art to which the present disclosure belongs may perform any modifications and changes in the form and details of the implementation without departing from the spirit and scope disclosed herein, but the scope of patent protection of the present disclosure should be subject to a scope defined by the attached claims.

INDUSTRIAL APPLICABILITY

Embodiments of the present disclosure provide a network function virtualization system and a network service instantiation method, which can meet requirements for phased evolution implemented by a current NFV system and for multinational, cross-regional, multi-vendor service provision and multi-layer management.

What is claimed is:

1. A network function virtualization (NFV) system, comprising:

a single-domain virtualized network function manager (VNFM);

a single-domain virtualized network function (VNF) entity;

a virtualized infrastructure manager (VIM);

one or more network function virtualized single-domain orchestrators (NFV-Dos), which belong to a domain layer and are in one-to-one correspondence with single-domains, wherein the NFV-Dos each comprises a virtualized network function orchestrator (VNFO), and the VNFO is configured to manage one or more of the following functions in a single-domain in which the VNFO is located: network service instance, network service life cycle, VNFM instantiation, VNF instantiation, and VNF life cycle; and a network function virtualization orchestrator (NFVO);

wherein the NFVO belongs to a network service layer and comprises a service orchestrator, SO, and a cross-domain resource orchestrator (CDRO);

the SO interacts with one or more VNFOs interfaced with the SO, and interacts with an operation support system (OSS), or a business support system (BSS) and is configured to perform one or more of the following cross-domain processes: network service orchestration, network service instance management, network service life cycle management, network service, and VNF instance policy management; and the CDRO in the network service layer interacts with one or more NFV-Dos in the domain layer and interfaced with the CDRO and/or interacts with multiple VIMs, and is configured to perform one or more of the following cross-domain processes: resource authentication and management, resource orchestration policy management, and resource monitoring;

wherein the NFV-Dos each further comprises: a single-domain resource orchestrator (RO), the RO is configured to, only when a resource of a single-domain in which the RO is located is insufficient and a cross-domain resource application is required, forward the cross-domain resource application to the CDRO, and when the resource of the single-domain in which the RO is located is sufficient, only interacts with the multiple VIMs to transmit a resource application in the single-domain in which the RO is located to the multiple VIMs.

2. The system according to claim 1, wherein the single-domain RO is configured to perform one or more of the following processes in a single-domain in which the single-domain RO is located: association of a VNF instance and a resource, resource authentication and management, resource orchestration policy management, and resource monitoring.

3. The system according to claim 1, wherein the VNFM and a VNF entity belong to the domain layer; and the VIM belongs to a virtual resource layer; and the system further comprises a computing resource pool, a network resource pool and a storage resource pool, which belong to the virtual resource layer; and an infrastructure belonging to a physical layer.

4. A network service instantiation method applied to a network function virtualization (NFV) system, wherein the NFV system comprises:

a single-domain virtualized network function manager (VNFM);

a single-domain virtualized network function (VNF) entity;

a virtualized infrastructure manager (VIM);

one or more network function virtualized single-domain orchestrators (NFV-Dos), which belong to a domain layer and are in one-to-one correspondence with single-domains, wherein the NFV-Dos each comprises a virtualized network function orchestrator (VNFO), and the VNFO is configured to manage one or more of the following functions in a single-domain in which the VNFO is located: network service instance, network service life cycle, VNFM instantiation, VNF instantiation, and VNF life cycle; and a network function virtualization orchestrator (NFVO);

wherein the NFVO belongs to a network service layer and comprises a service orchestrator, SO, and a cross-domain resource orchestrator (CDRO);

the SO interacts with one or more VNFOs interfaced with the SO, and interacts with an operation support system (OSS), or a business support system (BSS) and is configured to perform one or more of the following cross-domain processes: network service orchestration, network service instance management, network service life cycle management, network service, and VNF instance policy management; and the CDRO in the network service layer interacts with one or more NFV-Dos in the domain layer and interfaced with the CDRO and/or interacts with multiple VIMs, and is configured to perform one or more of the following cross-domain processes: resource authentication and management, resource orchestration policy management, and resource monitoring;

wherein the NFV-Dos each further comprises: a single-domain resource orchestrator (RO), the RO is configured to, only when a resource of a single-domain in which the RO is located is insufficient and a cross-domain resource application is required, forward the cross-domain resource application to the CDRO, and when the resource of the single-domain in which the RO is located is sufficient, only interacts with the multiple VIMs to transmit a resource application in the single-domain in which the RO is located to the multiple VIMs;

the method comprises:

upon receiving a VNF instantiation request by the VNFO of a single-domain, transmitting, by the VNFO of the single-domain, a resource reservation application;

upon receiving resource reservation information indicating that the resource reservation application is successful, initiating, by the VNFO, a VNF instantiation request to the virtual network function manager (VNFM) of the single-domain in which the VNFO is located; and initiating a resource instantiation request to a virtualized infrastructure manager (VIM) by the VNFM according to the resource reservation information.

5. The method according to claim 4, wherein the transmitting a resource reservation application comprises:

when the VNFO determines that the single-domain in which the VNFO is located has a RO, transmitting the resource reservation application to the RO by the VNFO;

determining whether the RO is a channel by the RO, if the RO is a channel, transmitting the resource reservation application to a CDRO by the RO; if the RO is not a channel, transmitting the resource reservation application to the VIM by the RO.

6. The method according to claim 5, after transmitting the resource reservation application, the method further comprising:

the RO receiving the resource reservation information from the VIM and transmitting the resource reservation information to the VNFO of the single-domain.

7. The method according to claim 4, before the VNFO of the single-domain receives the VNF instantiation request, the method further comprising:

receiving a network service instantiation request by a SO;

determining a home domain of a VNF instance in a service by the SO;

if the VNF instance belongs to a single-domain, transmitting, by the SO, the VNF instantiation request to a VNFO in the single-domain to which the VNF instance belongs; and if the VNF instance is a cross-domain VNF instance, transmitting, by the SO, a cross-domain VNF instantiation request to a cross-domain independent VNFM.

8. The method according to claim 7, after the transmitting a cross-domain VNF instantiation request to a cross-domain independent VNFM, the method further comprising:

initiating the resource reservation application to the CDRO by the cross-domain independent VNFM;

initiating the resource reservation application to the VIM by the CDRO, receiving, by the CDRO, the resource reservation information fed back by the VIM, and transmitting, by the CDRO, the resource reservation information to the cross-domain independent VNFM; and initiating the resource instantiation request to the VIM by the cross-domain independent VNFM according to the resource reservation information.

9. The method according to claim 5, after transmitting the resource reservation application, the method further comprising: the CDRO receiving the resource reservation information fed back by the VIM and feeding the resource reservation information to the VNFO that transmits the resource reservation application.

* * * * *